Patented May 1, 1923.

1,453,726

UNITED STATES PATENT OFFICE.

THEODORE C. PROUTY, OF LOS ANGELES, CALIFORNIA, ASSIGNOR TO PROUTYLINE PRODUCTS COMPANY, OF HERMOSA BEACH, CALIFORNIA.

INSULATING COMPOSITION AND METHOD OF MAKING SAME.

No Drawing.  Application filed April 13, 1920.  Serial No. 373,500.

*To all whom it may concern:*

Be it known that I, THEODORE C. PROUTY, a citizen of the United States, residing at Los Angeles, in the county of Los Angeles and State of California, have invented certain new and useful Improvements in Insulating Compositions and Methods of Making Same, of which the following is a specification.

This invention has for its object an improved composition of matter and the process of making same. One of the wide uses to which it is especially adapted is the manufacture of insulators for electricity including not only insulators for low temperatures such as insulating slabs, switchboards and other low temperature apparatus, but also insulating material which is especially subject to the action of high temperatures and high voltage such as the insulating sleeves used in spark-plugs for internal combustion engines; and some of the properties inherent in the composition manufactured by my process will be found highly useful in other connections than electrical apparatus. Certain parts of my improved process may be used independently of the other operations which constitute my process in its most amplified form for the production of compositions having some but not all of the properties of the product resulting from the use of the complete process.

The base or principal ingredient of my improved composition is talc. Talc from different sources, like other minerals, varies slightly in composition, and the necessity of using some of the ingredients mentioned in the following description of my process and the proportion to be used will, of course, be dependent to some extent on the composition of the particular talc used. The massive or solid talc, when free from seams or fissures, is in itself highly dielectric and free from action of acids and is especially adapted for use of insulating articles, but is impractical from a manufacturing standpoint owing to the difficulty of obtaining large quantities in block form free from fractures and uniform in texture. It has been very impractical to mold powdered talc and subsequently treat it without a multiplicity of minute fractures taking place due to the disruption from expansion of moisture or binder during the subsequent heating process. With my process all the advantages of massive talc are retained, and the hardness, strength and dielectric qualities of the original material are improved, producing a solid compact insulator of any dimension free from the defects common to what is known as porcelain or similar composition, in that sudden changes of temperature on different portions of the insulator will not tend to crack it; that it can be machined accurately and is free from variations in shrinkage; that it may be heated and cooled rapidly without fracturing; that it does not become bent or distorted in shape in the process of manufacturing; that with the complete treatment it is dielectric at temperatures above sixteen hundred degrees Fahrenheit, while ordinary porcelain or talc, under the same conditions, becomes a conductor at from three hundred to five hundred degrees Fahrenheit; that its coefficient of expansion may be made identical with that of steel which is not the case with ceramic structures, this being a very important factor in that, in nearly all their uses in one form or another, insulators and especially spark-plug insulators, have to be combined with steel structures, and the discrepancy between their coefficients of expansion becomes a large factor in the subsequent breakage of the material.

I will first describe a use which I have made of my process for the manufacture of spark-plug insulators, referring in the course of the description to alternative methods of applying the process. In the manufacture of many articles for which my improved composition is adapted, it is desirable to subject the material to machining operations such as turning, cutting, threading, tapping, etc., and when this is desirable, I adopt the following procedure.

Powdered talc is mixed with a small amount, generally from two to ten per cent of a temporary binder such as a phenolic condensation product or a temporary binder having similar volatilizing properties. I employ the term "temporary binder" in accordance with usage to denote a binder composed principally or wholly of organic substances, preferring those mentioned above, for the reason that they will permanently harden and bond the talc at a temperature sufficiently low as not to chemically change the characteristics of the talc, leaving the structure such that it may be machined without dulling the tools, and at the same time, permitting a subsequent heating at a temperature sufficiently high to harden the talc after such machining, and volatilize the temporary binder without disrupting or distorting the shape, contour or size of the finished article. The mixture is then molded to the desired form under pressure. In general it may be said that the higher the pressure the finer the texture and the greater the dielectric strength of the resulting product. In the manufacture of spark-plug insulators I have found a pressure of twenty-five thousand pounds per square inch suitable.

The pressure imparts sufficient coherency to the mixture to permit of its being removed from the mold prior to heating, thus obviating the necessity of heating the molds and rendering it possible to operate with the minimum number of molds, as for each article produced the mold is used only for the brief time required for the actual molding operation. I have found in practice that powdered talc, even though thoroughly mixed with a temporary binder, contains a very large percentage of air, and when compressed in a die immediately reacts when the pressure is relieved, causing a perceptible increment in the size of the molded article, but that by applying a vacuum to the material or preferably applying a vacuum to the mold just prior to compressing, all of the air is eliminated and the resulting article when it leaves the mold is free from expansion and is correspondingly less porous in subsequent treatments. After being molded under pressure with or without the vacuum treatment, the article is removed from the mold and subjected to preliminary heating at a temperature of about two to four hundred degrees Fahrenheit. The temperature of this preliminary heating will vary with the particular materials employed and the proportions in which they are present, but the correct temperature is easily ascertained in any particular case by a few preliminary experiments. The preliminary heating to the correct temperature, which temperature is always low as compared with that of the final heating, produces a material that can be machined as readily as metal. The machining operations are, therefore, performed at this stage.

The next stage after the machining, consists in heating the molded and machined article to a considerably higher temperature, generally about two thousand degrees Fahrenheit. The peculiar properties of the condensation product mentioned above are such that they do not, as is the case of water or other binders of an expansive nature, disrupt or disintegrate the formation of the homogenous structure of the talc when heated rapidly above temperatures at which they volatilize. The results of a few experiments with any given mixture are sufficient to determine the necessary temperature. This second heating increases the hardness and strength of the substance and causes only a very minute shrinkage. The shrinkage is very uniform and correct allowance for it may be made without difficulty or uncertainty in fixing the dimensions imparted by the initial molding and machining operations.

For many purposes the hardness, strength and dielectric capacity of the composition are sufficient at this stage, but the dielectric qualities especially at high temperatures are very greatly increased as well as the hardness and strength of the material, and a certain degree of porosity and absorptiveness which exist at this stage is removed by the subsequent steps of the process. The next step consists in immersing the article in a solution of a metallic compound or otherwise applying the solution in such manner that the composition becomes impregnated with it, this operation preferably being performed in vacuo to facilitate the absorption of the solution. Quite a wide variety of soluble metallic compounds may be used, among them preferably being sulphates or chlorides of aluminum, iron or chrome. Practically all of the advantages except removal of the porosity and absorptiveness may be obtained, as more fully explained hereinafter, by mixing the dry metallic compound with the talc at the beginning of the process, but superior results in decreasing the porosity and absorptiveness are attained by impregnating with solution as above described. After impregnation with the metallic compound solution, the composition is again heated. When ferrous sulphate is used, this heating should be to about eighteen hundred degrees, this temperature, like the others referred to herein, being easily ascertained by a few experiments when operating for the first time with materials from a new source which may have slightly varying characteristics.

In most cases it is advantageous to again impregnate the composition with metallic compound solution and to follow this with another heating, repeating the operation of impregnating and heating four or five times. The effect of filling the pores with the metallic compound and heating as above described, is to reduce porosity, and at the same time, to greatly increase its hardness and dielectric capacity at high temperatures. The composition produced by the process above described is especially notable in that its dielectric strength is not only superior to that of porcelain at ordinary temperatures, but, unlike porcelain, it retains its dielectric strength practically unimpaired at high temperatures such as those prevailing in the cylinder of internal combustion motors.

The metallic compound used, as described above, may be applied in the same way to other products such as the various ceramic materials, and with the same advantages in increasing the dielectric strength at high temperatures.

The heating of my improved composition at the various stages of manufacture as hereinbefore described consists merely in bringing the material up to the necessary temperature and then cooling it.

Slow heating or cooling as compared with porcelain is unnecessary; the composition may be heated rapidly and be removed from the oven and cooled rapidly in the open air at ordinary temperatures.

As the articles remain in the mold only while being subjected to pressure and are then removed and rapidly heated and cooled, the entire process of manufacture occupies only a short time, and despite the rapidity of the operation there is none of the distortion or cracking that can be avoided in the manufacture of ordinary ceramic articles only by slow and careful heating and cooling occupying long intervals of time.

As above stated, the effect of the metallic compound in increasing the hardness and dielectric strength of the composition may be obtained by mixing the metallic compound, such as ferric or chrome oxide, with the talc at the beginning of the process and then compressing and heating, but without the impregnation with a solution of a metallic compound the material is left in a more or less porous and absorbent condition unless completely vitrified. But even when the step of impregnating with a solution of a metallic compound with subsequent heating is performed as above described, its admixture with the talc at the beginning of the process is advantageous in those instances where it is desirable to introduce into the composition a greater amount of metallic compound than can be introduced by impregnating with a solution. Ordinarily, however, the amount necessary is quite minute and that introduced by impregnating with a solution is in most instances sufficient.

When the final form is given to the finished articles by molding and without any machining operation, the first heating to a comparatively low degree is omitted, and the material is subjected to the higher temperature immediately after the molding and the remainder of the process carried out as above described.

The facility with which my new composition can be machined at the intermediate stage above described makes it possible and practical to form articles with accurately cut screw threads, and this, in connection with the fact that the coefficient of expansion of the composition is almost the same as that of iron, renders it possible to attach parts made of the composition to associated parts of iron or steel by a direct screw-thread connection even in those instances where the assembled structure is subjected in use to wide variations of temperature.

I have referred to the temperatures employed as being below that necessary to cause vitrification, for the reason that complete vitrification is both a slower and more expensive process, but I do not mean to exclude the possibility of vitrification of any or all of the ingredients.

As above stated, the hardening effect of the metallic compound may be obtained by mixing the metallic compound with the powdered talc at the beginning of the process, but superior results in the way of decreasing the porosity and absorptiveness of the composition are obtained without the expense of complete vitrification by impregnating the partially formed composition with a solution of metallic compound and proceeding as described. My invention in its broader aspect includes either method of procedure or both.

The temporary binder is not in all cases necessary, especially when the intermediate machining stage is unnecessary as in the manufacture of articles that can be given their final form by molding. My invention in certain aspects as defined in some of the appended claims includes certain operations in which a temporary binder is not used, though for most purposes even when the intermediate machining stage is omitted, I prefer to use a temporary binder, preferably a phenolic condensation product.

Several alternative methods of procedure depending upon the use to which the material is to be put may be adopted after the product is brought to the point where it is ready for impregnation with a solution of metallic compound.

After impregnation and heating, or repeated impregnation and heating, as above described, the process may be terminated, the product so formed being of a highly superior quality for spark-plug insulators and many other purposes. If desirable for any purposes, however, the temperature after impregnation can be carried to a point high enough to vitrify the entire mass. I have found compounds of chromium more suitable than iron compounds for use when the temperature is to be carried high enough to vitrify the mass, some iron compounds showing a tendency to form a sort of slag that reduces the compactness of the mass when subjected to vitrifying temperatures. In some instances the mass consisting of talc and a temporary binder may be vitrified without impregnating with a metallic solution. Where the finished article is not to be subjected to extremely high temperatures but is to be both dielectric and weather proof the article may be molded, machined and fired as previously described and then impregnated with a non-refractory filler, i. e. a substance not capable of withstanding temperatures above a few hundred degrees without decomposition or volatilization. The filler may be introduced at the stage of the process when the material has been brought to the point where it is ready, as above described, for impregnation with metallic compound and heating, the precise method of procedure depending on the characteristics desired in the finished product. The filler may be applied in solution. After the filler has penetrated the material, the material should be heated to a temperature dependent on the nature of the filler used. When certain phenolic condensation products are used as a filler, I have found that a temperature of three hundred to four hundred degrees Fahrenheit is suitable. It will be understood that when the substances which I have termed fillers are used, the resulting product is not adapted or intended for uses in which it is subjected to high temperatures, but the composition so produced possesses superior advantages for use as insulating slabs in switchboards and other instruments and for insulators that in use are immersed in oil as well as for many other purposes.

Having thus described my invention, I claim:

1. In a process of forming a composition of matter, the operations of mixing dry powdered talc with a temporary binder free of water and heating the mixture.

2. In a process of forming a composition of matter, the operations of mixing dry powdered talc with a temporary binder consisting of an organic substance free of water, and heating the mixture to a degree insufficient to decompose or volatilize the binder.

3. In a process of forming a composition of matter, the operations of mixing powdered talc with a phenolic condensation product and heating the mixture.

4. In a process of forming a composition of matter, the operations of mixing powdered talc with a phenolic condensation product and heating the mixture to a degree insufficient to decompose or volatilize the phenolic condensation product.

5. In a process of forming a composition of matter, the operations of mixing dry powdered talc with a temporary binder consisting of an organic substance free of water, heating the mixture to a degree insufficient to decompose or volatilize the binder, machining the resulting product, and then heating to a temperature above that necessary to decompose or volatilize the binder.

6. In a process of forming a composition of matter, the operations of mixing powdered talc with a phenolic condensation product, heating the mixture to a degree insufficient to decompose or volatilize the phenolic condensation product, machining the resulting product, and then heating to a temperature above that necessary to decompose or volatilize the phenolic condensation product.

7. In a process of forming a composition of matter, the operations of mixing dry powdered talc with a temporary binder consisting of an organic substance free of water, heating the mixture to a degree insufficient to decompose or volatilize the binder, machining the resulting product, and then heating to a temperature above that necessary to decompose or volatilize the binder but below that necessary to cause vitrification of the product.

8. In a process of forming a composition of matter, the operations of mixing powdered talc with a phenolic condensation product, heating the mixture to a degree insufficient to decompose or volatilize the phenolic condensation product, machining the resulting product, and then heating to a temperature above that necessary to decompose or volatilize the phenolic condensation product but below that necessary to cause vitrification of the product.

9. In a process of forming a composition of matter, the operations of mixing powdered talc with a temporary binder, heating the mixture to a degree insufficient to decompose or volatilize the binder, machining the resulting product, then heating to a temperature above that necessary to decompose or volatilize the binder but below that necessary to cause vitrification of the product, impregnating the product so formed with a metallic compound and reheating.

10. In a process of forming a composition of matter, the operations of mixing powdered talc with a phenolic condensation product, heating the mixture to a degree insufficient to decompose or volatilize the phenolic condensation product, machining the resulting product, then heating to a temperature above that necessary to decompose or volatilize the phenolic condensation product but below that necessary to cause vitrification of the product, impregnating the product so formed with a metallic compound and reheating.

11. In a process of forming a composition of matter, the operations of mixing powdered talc with a temporary binder, heating the mixture to a degree insufficient to decompose or volatilize the binder, machining the resulting product, then heating to a temperature above that necessary to decompose or volatilize the binder, causing the resulting product to absorb a non-refractory filler, then heating to a temperature below that 12. In a process of forming a composition of matter, the operations of mixing powdered talc with a phenolic condensation product, heating the mixture to a degree below that necessary to decompose or volatilize the phenolic condensation product, machining the resulting product, then heating to a temperature above that necessary to decompose or volatilize the phenolic condensation product, causing the resulting product to absorb the phenolic condensation product, then heating to a temperature below that necessary to decompose or volatilize the phenolic condensation product.

13. In a process of forming a composition of matter, the operations of mixing powdered talc with a temporary binder, heating the mixture to a degree insufficient to decompose or volatilize the binder, machining the resulting product, then heating to a temperature above that necessary to decompose or volatilize the binder but below that necessary to cause vitrification of the product, impregnating the product so formed with a metallic compound and reheating, causing the resulting product to absorb a non-refractory filler, then heating to a temperature below that necessary to decompose or volatilize said filler.

14. In a process of forming a composition of matter, the operations of mixing powdered talc with a phenolic condensation product, heating the mixture to a degree insufficient to decompose or volatilize the phenolic condensation product, machining the resulting product, then heating to a temperature above that necessary to decompose or volatilize the phenolic condensation product but below that necessary to cause vitrification of the product, impregnating the product so formed with a metallic compound and reheating, causing the resulting product to absorb the phenolic condensation product, then heating to a temperature below that necessary to decompose or volatilize the phenolic condensation product.

15. In a process of forming a composition of matter, the operation of subjecting a mixture of talc and a non-alkaline metallic compound to heat.

16. The process of increasing the dielectric strength of a composition of talc and a temporary binder by impregnating the same with a metallic compound and heating.

17. The process of increasing the dielectric strength of a composition of talc and a phenolic condensation product by impregnating the same with a metallic compound and heating.

18. In a process of forming a composition of matter, the operations of mixing powdered talc with a temporary binder and a metallic compound, molding under pressure and then heating to a temperature insufficient to decompose or volatilize the binder.

19. In a process of forming a composition of matter, the operations of mixing powdered talc with a temporary binder and a metallic compound, molding under pressure, and heating the mixture to a temperature sufficient to decompose the binder and harden the resulting product.

20. In a process of forming a composition of matter, the operations of mixing powdered talc with a phenolic condensation product and a metallic compound, molding under pressure and heating to a temperature insufficient to decompose or volatilize the binder.

21. In a process of forming a composition of matter, the operations of mixing powdered talc with a phenolic condensation product and a metallic compound, molding under pressure and then heating to a temperature sufficient to decompose the binder and harden the resulting product.

22. In the process of forming a composition of matter, the operations of mixing powdered talc with a temporary binder and a metallic compound, applying a vacuum to the mixture molding the mixture under pressure, heating the article to a degree sufficient to harden but not decompose the binder, machining the resulting product, heating to a temperature sufficient to volatilize the binder but below that necessary to cause vitrification of the product, impregnating the product so formed with a solution of metallic compound and reheating, causing the resulting product to absorb a dielectric filler, then heating to a temperature sufficient to harden said filler.

23. In a process of the class described, the operation of molding powdered talc under pressure to a desired form, heating the molded talc to a temperature above 1000° Fahrenheit, impregnating the molded talc after such heating with a metallic compound and again subjecting the molded talc to heat.

24. In a process of forming a composition of matter, the operation of subjecting a mixture of talc and a non-soluble metallic compound to heat.

25. The process of increasing the dielectric strength of a ceramic body by impregnating with a metallic compound and heating.

26. The process of increasing the dielectric strength of a ceramic body by adding a non-soluble metallic compound and heating.

27. The process of increasing the dielectric strength of a talc body by impregnating with a metallic compound and heating.

28. The process of increasing the dielectric and mechanical strength of a body consisting principally of talc by mixing therewith a non-soluble metallic compound, forming, and heating to vitrification.

29. In a process of the class described, the operation of molding powdered talc to the desired form, heating the molded talc to a temperature above 1000° Fahrenheit, causing the resulting product to absorb a non-refractory filler and heating to a temperature below that necessary to decompose or volatilize said filler.

30. In a process of forming a composition of matter, the operation of subjecting a mixture of talc and a compound of a metal of a valency higher than one to heat.

31. In a process of forming a composition of matter, the operation of subjecting a mixture of talc and a compound of a metal of a higher valency than one to heat, impregnating the substance so formed with a non-refractory filler and then subjecting to a degree of heat below that necessary to decompose or volatilize said filler.

32. In a process of forming a composition of matter, the operation of subjecting a compressed mass of comminuted talc having a metallic compound mingled therewith to a temperature in excess of one-thousand degrees Fahrenheit.

In testimony whereof, I have subscribed my name.

THEODORE C. PROUTY.